June 6, 1939.  D. T. BRADLEY  2,160,808
EXHAUST PIPE AND MUFFLER SUPPORT
Filed Feb. 15, 1938
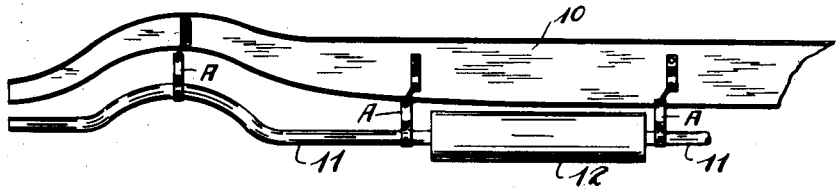
Fig. 1
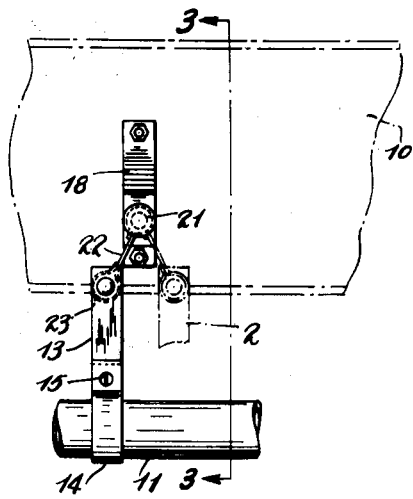
Fig. 2
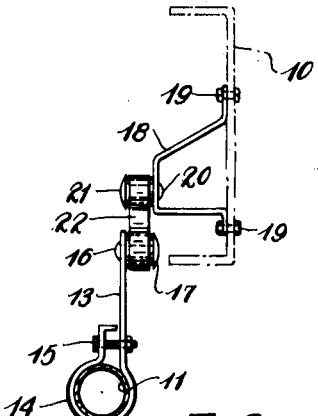
Fig. 3
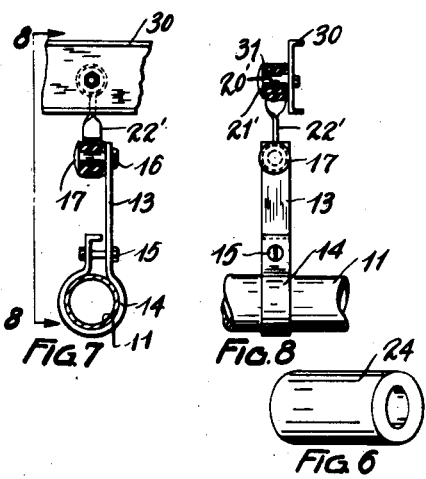
Fig. 7  Fig. 8
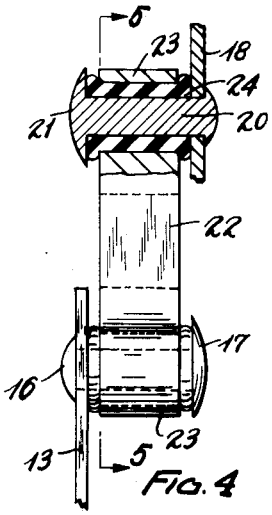
Fig. 4
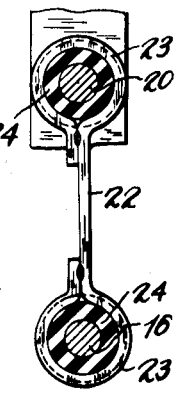
Fig. 5
Fig. 6
INVENTOR.
DAN T. BRADLEY
BY Kwis Hudson & Kent
ATTORNEYS Patented June 6, 1939

2,160,808

UNITED STATES PATENT OFFICE 2,160,808

EXHAUST PIPE AND MUFFLER SUPPORT

Dan T. Bradley, Detroit, Mich., assignor to Harris Products Company, Akron, Ohio, a corporation of Ohio Application February 15, 1938, Serial No. 190,609

5 Claims. (Cl. 280—106)

This invention relates to supporting means for the exhaust pipes and mufflers of motor vehicles and has for one of its objects the provision of a flexible supporting means that will permit the exhaust to expand and contract longitudinally in accordance with changes in temperature, and that will also serve as a cushioning means, and embody means for so insulating the exhaust pipe that the exhaust noises therein will not be transmitted to the vehicle frame.

A further object of the invention is to provide a very simple form of supporting means that will embody the above-mentioned features and also be comparatively inexpensive to manufacture, easy to assemble, and have a long operating life.

Other objects of the invention and the features of novelty will be apparent from the following description, taken in connection with the accompanying drawing, of which Fig. 1 is a fragmentary side elevation of a motor vehicle frame and exhaust pipe and muffler having one form of my improved supporting means.

Fig. 2 is an enlarged fragment of Fig. 1 showing one of the exhaust pipe supports.

Fig. 3 is a transverse section on the line 3—3 of Fig. 2.

Fig. 4 is an enlargement of the supporting link, as shown in Fig. 3, with the joint at the upper end of the link shown in section.

Fig. 5 is a section on the line 5—5 of Fig. 4.

Fig. 6 is a perspective view of one of the rubber bushings before installation.

Fig. 7 is a view similar to Fig. 3 but showing a modified form of the invention.

Fig. 8 is a side elevation thereof with the upper joint shown in section, as viewed from line 8—8 of Fig. 7.

Referring to the drawing, 10 indicates one of the side members of a motor vehicle frame and 11 the motor exhaust pipe which has a muffler 12 therein. The forward end of the exhaust pipe will be connected with the motor (not shown) and, therefore, the expansion of the exhaust pipe due to the heat of the exhaust gases will be toward the rear of the vehicle, the maximum amount of the movement being at the rear end of the exhaust pipe, and the movement at any point along the pipe will depend upon its remoteness from the motor. Accordingly, it is important to have the exhaust pipe supported by means which will be adapted to accommodate any lengthening and shortening of the pipe at the point where the support is located. From the standpoint of manufacture it is also desirable that all of the supports along the exhaust pipe shall be alike.

It has heretofore been customary to support the exhaust pipe from the frame of the vehicle by means of metallic parts, and this has resulted in any noises in the muffler and exhaust pipe being telegraphed through these metallic connections to the frame, and this is objectionable, particularly in passenger automobiles.

The supports embodying my invention are indicated at A in Fig. 1. As many of these supports as may be desired may be used and I have illustrated three in Fig. 1. Each of these supports consists of an arm 13 having a loop 14 at its lower end which surrounds the pipe 11 and is clamped thereto by means of a bolt 15. To the upper end of the arm 13 there is secured, by riveting or in any other suitable manner, a pintle 16 having a relatively large head 17. By providing the loop 14 and the clamping bolt 15, for securing the arm 13 to the pipe 11, it is possible to conveniently adjust the position of the arm along the exhaust pipe and this is of importance in connection with the assembling of the parts. A bracket 18 of any preferred design but, as shown in the drawing, consisting of a bent bar of rectangular cross section, is secured to the frame 10 by bolts or rivets 19 and this bracket carries a pintle 20 which may be similar to the pintle 16 and may be secured to the bracket 18 by riveting or in any other suitable way. The pintle 20 has a relatively large head 21. A link 22, preferably formed of a bar of rectangular cross section with cylindrical loops or eyes 23 at its ends forms the supporting connection between the pintles 16 and 20. Rubber bushings 24 are arranged on the pintles 16 and 20 and within the eyes 23, thereby serving as cushions or sound insulators between the link 22 and the pintles which will prevent sounds from being telegraphed up through the supports from the exhaust pipe to the frame 10.

In assembling the parts of the supports the rubber bushings 24, as shown in Fig. 6, are placed on the pintles 16 and 20 and then the bushings are inserted in the eyes 23 of the link 22. The pintle 16 is inserted in the opening therefor in the arm 13 and forced through this opening a sufficient distance to compress the bushing 24 so that it will assume the shape shown in Fig. 4 and be axially compressed sufficiently to cause the rubber to adhere to the pintle and the interior of the eye 23 so that any oscillations of the link 2, relative to the pintle, will be accommodated by the torsional flexing of the rubber bushing. With the rubber bushing thus compressed the end of the pintle 16 which extends through the arm 13 is riveted over or otherwise secured permanently to the arm. In a similar manner the pintle 20 with its bushing 21 is secured to the bracket 18.

The bracket 18 may then be secured to the frame 10, by the bolts or rivets 19 and the arm 13 may be clamped to the exhaust pipe 11 by means of the bolt 15.

In securing the arm 13 to the exhaust pipe it is preferable to position the arm slightly forward of the bracket 18, as shown in broken lines in Fig. 2, because the parts will be cold when assembled and this will permit the arm 13 to be moved to the rear of its bracket 18 by the expansion of the exhaust pipe so that the normal position of the arm 13 relative to its bracket 18, when the exhaust pipe is hot, will be substantially as shown in full lines in Fig. 2.

It is preferable to locate one of the supports A adjacent each end of the muffler 12 in order to insure that the muffler will be properly supported and maintained in position notwithstanding the jolts to which it will be subjected when the vehicle is in service.

An advantage of the construction described is that while the several supports have the requisite flexibility to accommodate the lengthening and shortening of the exhaust pipe, and embody oscillating joints at the ends of the shackle links 22, the movements of the parts will not cause any wear because of the fact that the oscillations are taken up by the torsional flexing of the rubber bushings and, in addition, no lubrication will be required, this being a very substantial advantage because of the fact that the exhaust pipe supports are installed in relatively inaccessible places on the vehicle where lubrication would be difficult, and usually neglected, if required.

Referring to the modification illustrated in Figs. 7 and 8, it will be noted that the pintle 20' is arranged at right angles to the pintle 16 and secured to a cross-member or bracket 30 of the vehicle frame. The upper end of link 22' is adapted to oscillate about the pintle 20' and this permits the support as a whole to swing crosswise of the vehicle. To accommodate longitudinal expansion of the exhaust pipe 11 the link 22' may oscillate on the pintle 16 and the rubber bushing 31 permits swinging movement of the link 22' axially of the pintle 20'. This construction provides flexibility both longitudinally and transversely of the vehicle.

While I have illustrated and described what I now consider to be the preferred form of my invention, it will be understood by those skilled in the art that various changes in the details of construction may be made to suit individual requirements and preferences, without departing from the spirit of the invention as defined in the appended claims.

Having thus described my invention, I claim:

1. In a motor vehicle the combination of a frame, a motor exhaust pipe including a muffler, and means for supporting said pipe comprising an arm on said pipe having a pintle secured thereto, a pintle on said frame, torsionally flexible bushings on said pintles, and a link having eyes at its ends in which said bushings are mounted.

2. In a motor vehicle the combination of a frame, a motor exhaust pipe including a muffler, and means for supporting said pipe comprising an arm having an adjustable clamping connection with said pipe, a link, an oscillatable connection embodying a torsionally flexible compressed rubber bushing between said arm and said link, and an oscillatable connection embodying a torsionally flexible rubber bushing between said link and said frame.

3. In a motor vehicle the combination of a frame, a motor exhaust pipe including a muffler, and means for supporting said pipe comprising an arm having an adjustable clamping connection with said pipe, a pintle mounted on said frame with its axis at right angles to said pipe, a pintle on said arm and arranged parallel with the first-mentioned pintle, a link having eyes through which said pintles extend, and compressed rubber bushings between said pintles and said eyes and frictionally engaged therewith whereby the oscillatory movements of said link relative to said pintles is accommodated by the torsional flexing of said bushings.

4. In a motor vehicle, the combination of a frame, a motor exhaust pipe including a muffler, and a flexible support for said pipe permitting longitudinal expansion thereof and comprising a plurality of arms secured to said pipe and each having a pintle thereon which projects transversely of said pipe, a plurality of pintles on said frame and extending parallel with the first-mentioned pintles, rubber bushings on said pintles, links having eyes at their opposite ends, each of said links connecting the pintle on one of said arms with one of the second-mentioned pintles by having the eyes of the link mounted on the rubber bushings on said pintles, and said pintles being provided with means for compressing said rubber bushings whereby said bushings will be so secured to said pintles and eyes that the oscillatory movements of the links relative to the pintles which they connect will be accommodated by the torsional flexing of the bushings.

5. In a motor vehicle, the combination of a frame, a muffler for the motor exhaust and means for supporting said muffler for movement longitudinally of said frame comprising arms at the opposite ends of the muffler so connected therewith as to be adjustable longitudinally thereof, each of said arms having a pintle thereon, pintles on said frame adjacent the first-mentioned pintles, the axes of said pintles extending transversely of said frame, links having eyes at their opposite ends, rubber bushings on said pintles and fitting within said eyes so that each of said links forms a connection between one of the first-mentioned pintles and one of the second-mentioned pintles, and said pintles having heads and being so mounted on the parts which carry them that said bushings are subjected to axial compression.

DAN T. BRADLEY.